United States Patent
Daume

(10) Patent No.: US 6,943,299 B1
(45) Date of Patent: *Sep. 13, 2005

(54) ELECTROCONDUCTIVE PIPE OR CABLE CLAMP

(75) Inventor: Britta Daume, Burgwedel (DE)

(73) Assignee: Daume Patentbesitzgesellschaft mbH, Burgwedel (DE)

( * ) Notice: Subject to any disclaimer, the term of this patent is extended or adjusted under 35 U.S.C. 154(b) by 39 days.

This patent is subject to a terminal disclaimer.

(21) Appl. No.: 10/181,955

(22) PCT Filed: Jul. 10, 2000

(86) PCT No.: PCT/EP00/06532

§ 371 (c)(1),
(2), (4) Date: Jun. 6, 2003

(87) PCT Pub. No.: WO01/57959

PCT Pub. Date: Aug. 9, 2001

(30) Foreign Application Priority Data

Feb. 3, 2000 (DE) .......................................... 100 04 671
Jun. 30, 2000 (DE) .......................................... 100 31 101

(51) Int. Cl.⁷ ............................................. H02G 15/02
(52) U.S. Cl. ...................... 174/78; 174/75 C; 174/84 C
(58) Field of Search ................................ 174/78, 75 C, 174/84 C, 40 CC; 439/98, 99

(56) References Cited

U.S. PATENT DOCUMENTS

| | | | |
|---|---|---|---|
| 2,279,866 A | | 4/1942 | Ellinwood |
| 2,338,659 A | * | 1/1944 | Morehouse ................ 248/74.3 |
| 2,387,295 A | * | 10/1945 | Robertson .................. 248/74.3 |
| 2,416,063 A | * | 2/1947 | Nicholls ................. 174/40 CC |
| 2,425,153 A | | 8/1947 | Harrison |
| 3,891,291 A | | 6/1975 | Nadsady et al. |
| 4,189,807 A | * | 2/1980 | Byerly ....................... 24/16 R |
| 4,659,870 A | | 4/1987 | Jones |
| 6,441,303 B1 | * | 8/2002 | Daume ......................... 174/51 |
| 6,534,714 B2 | * | 3/2003 | Daume ......................... 174/78 |

FOREIGN PATENT DOCUMENTS

| | | |
|---|---|---|
| DE | GM 1927667 | 12/1970 |
| DE | 198 42 380 | 2/2000 |
| DE | 199 22 843 | 2/2000 |
| DE | 198 41 199 | 3/2000 |
| DE | 199 22 856 | 3/2000 |
| DE | 199 43 664 | 3/2000 |
| DE | 19841186 A1 | 3/2003 |
| EP | 0744788 A1 | 11/1996 |
| WO | WO 00/08369 | 2/2000 |

OTHER PUBLICATIONS

International Search Report, dated Nov. 13, 2000.
International Search Report mailed Nov. 13, 2000 (3 pgs.).

* cited by examiner

*Primary Examiner*—Chau N. Nguyen
(74) *Attorney, Agent, or Firm*—Shlesinger, Arkwright & Garvey LLP

(57) ABSTRACT

This invention relates to a device (2) for establishing an electroconductive contact with an especially elongated, for example substantially cylindrical body, for example a pipe or a cable. The inventive device comprises a base body (4) that consists at least partially of an elastic material and that is meant to be put on the body to be contacted. A contact element (22) that is held, when mounted, on a side of the body to be contacted facing the base body (4), is designed to establish an electroconductive connection with the body to be contacted. According to the invention, retainers are integrally formed with the elastic material and substantially positively enclose the contact element (22) at least on two opposite zones of its rim on the side facing away from the base body (4), thereby retaining it on the base body (4).

35 Claims, 5 Drawing Sheets

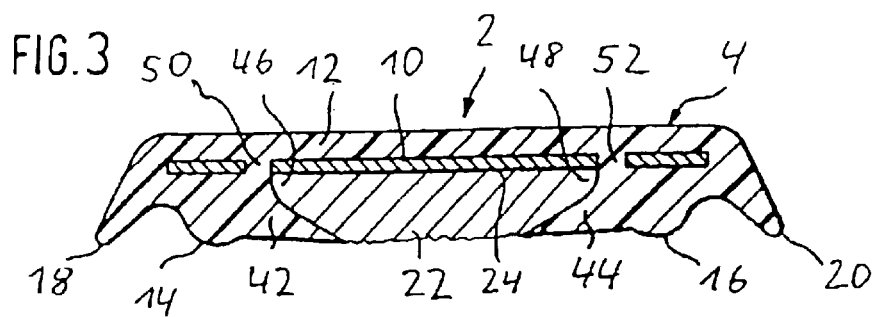
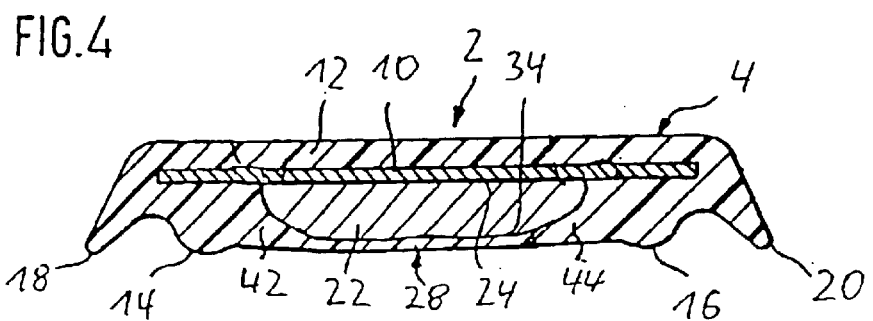
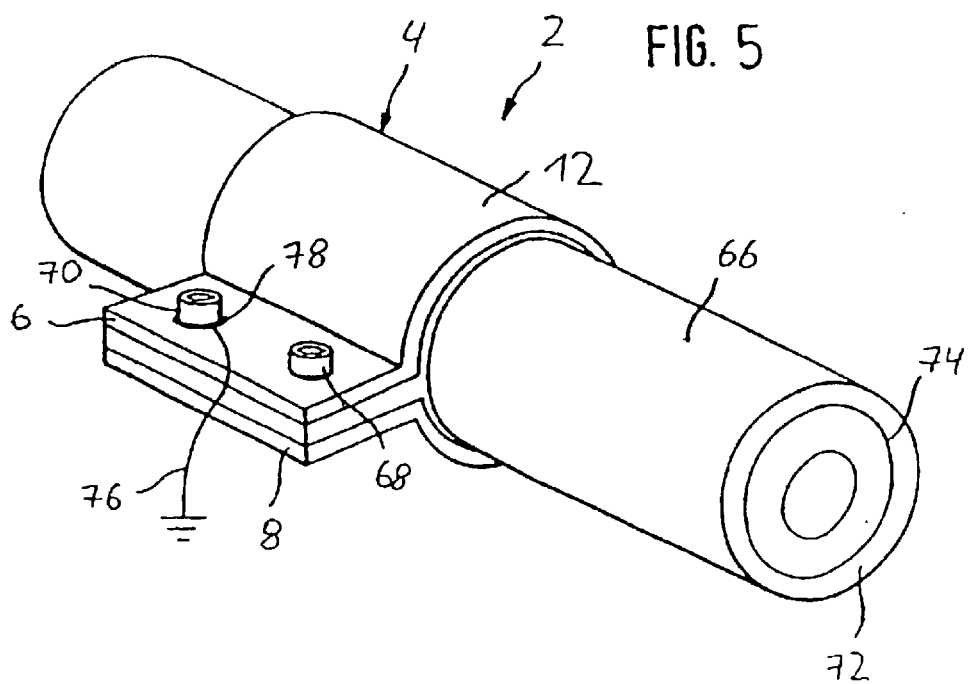

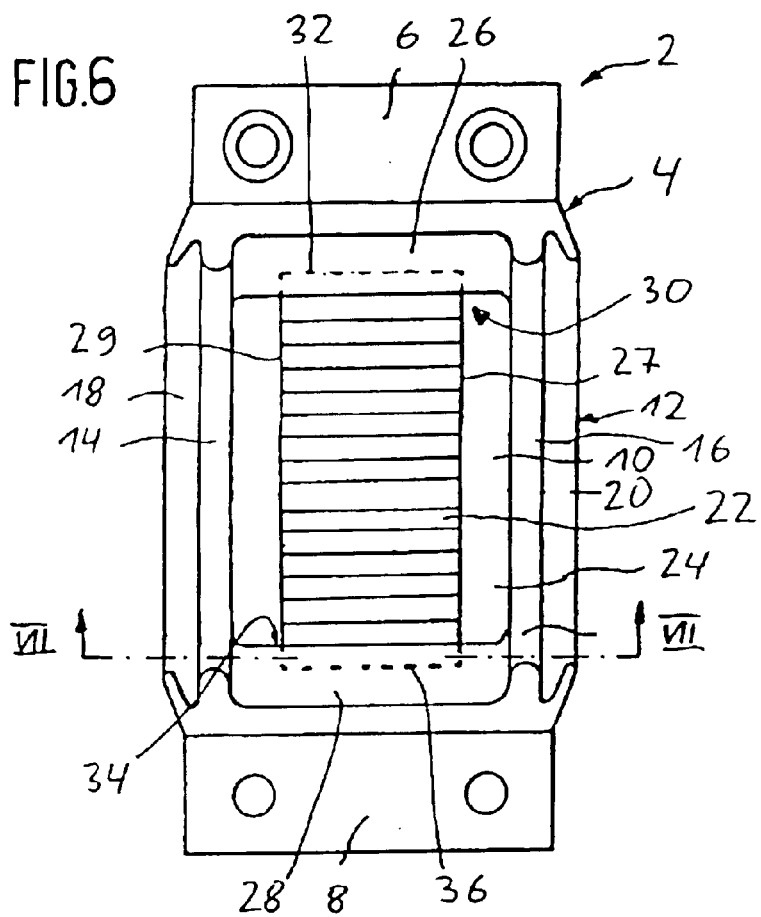
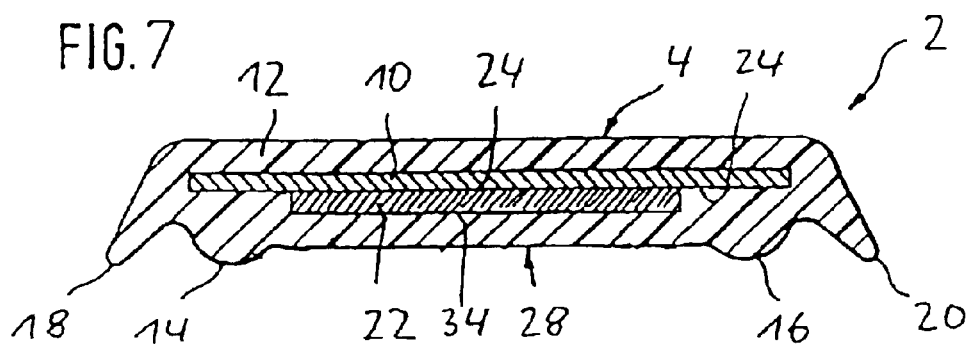

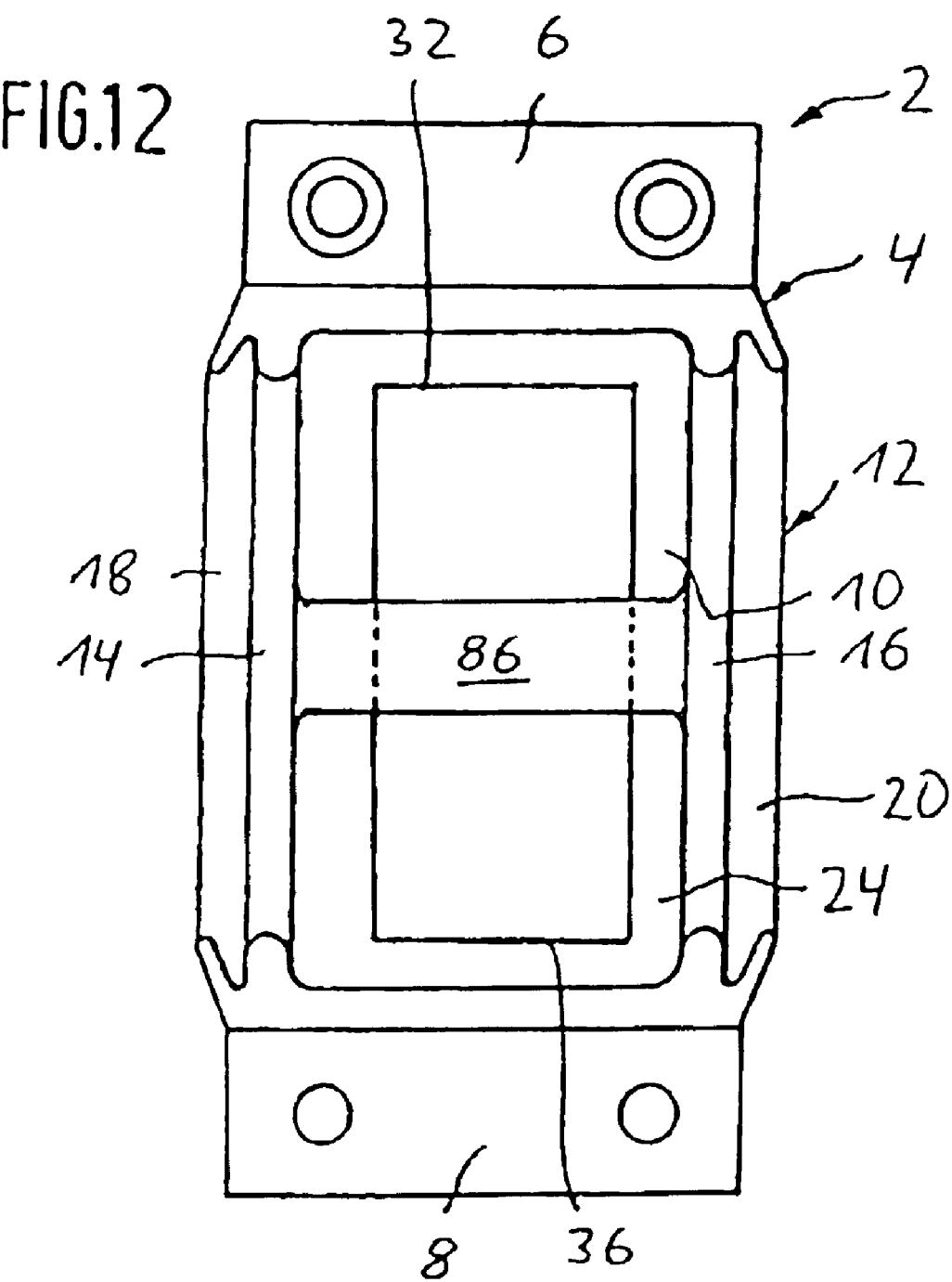

ELECTROCONDUCTIVE PIPE OR CABLE CLAMP

FIELD OF THE INVENTION

The invention relates to a device for establishing electrically conductive contact with an electrically conductive part of an elongated, e.g. a substantially cylindrical body, for instance a pipe or a cable.

Such devices are used, for instance, to connect a metallic pipe or a stripped outer conductor of a coaxial cable to a ground cable.

BACKGROUND OF THE INVENTION

EP 0 744 788 A1 discloses a device of this type, which comprises a main body that is applied to a body to be contacted and a contact element to establish an electrically conductive connection with the body to be contacted. This contact element is held by retention means on a side of the main body that faces toward the body to be contacted when mounted. In this prior-art device, the main body has a strip-shaped metallic clamp, which is embedded in an elastic material. On the side that faces toward the body to be contacted when mounted, a contact surface is left free for the contact element. The contact element in this prior-art device is formed by a strip of copper braiding. The retention means for holding the contact element to the main body in this prior-art device is formed by an adhesive or a weld joint. In the desired mounting position, the longitudinal edges of the contact element extend substantially parallel to the adjacent edges of the main body.

When the contact element is mounted to the main body by means of a weld joint, there is a risk that the contact element may be detached from the main body and may be lost. A new contact element must then be procured before the device can be mounted. This is time consuming and increases the cost of both material and installation.

Mounting the contact element by means of an adhesive has the drawback that it undesirably increases the electrical resistance between the contact element and the strip-shaped metallic clamp of the main body.

OBJECTS AND SUMMARY OF THE INVENTION

The object of the invention is to define a device of the type described above, the production of which is simplified.

The fundamental idea of the teaching according to the invention is to form the retention means onto the elastic material of the main body. According to the invention, these retention means comprise at least one retention part that is formed onto the elastic material of the main body. This retention part extends from one edge of the contact element to the opposite edge thereof, such that the retention part overlaps the contact element on its side facing away from the main body and thus holds it to the main body. In this manner, the contact element is held on the main body in a substantially form-fitting manner.

The inventive embodiment thus makes separate retention means, e.g. in the form of an adhesive, a weld joint or a clamping component, basically unnecessary. As a result the construction of the inventive device is simplified and the device can be produced more cost-effectively. If any additional fixation of the contact element is desired, e.g. by means of an adhesive, this additional fixation can be effected over a smaller surface than in the prior-art devices.

The retention means can be embodied in any suitable manner, e.g. in the form of narrow strips of an elastic material, which are formed onto the elastic material of the main body and extend perpendicularly across the retention element on its side facing away from the main body. A highly advantageous further development of the teaching according to the invention provides that the retention part forms a substantially pocket-like receptacle for the contact element. To mount the contact element to the main body in this embodiment, it is inserted into the pocket-like receptacle and can thus be mounted faster and more easily to the main body.

A further development of the aforementioned embodiment provides that the retention part has an opening that forms the pocket-like receptacle. This opening can be formed in the retention part, for instance during injection molding of the main body and the retention means.

Another further development provides that the pocket-like receptacle be formed between two surfaces of the retention part facing one another and the main body. In this embodiment, the retention part can be configured, for instance, as a flat strip made of an elastic material.

In principle, it is sufficient if the retention means have a single pocket-like receptacle. An advantageous further development of the embodiment with the pocket-like receptacle provides, however, that the retentions means comprise two retention parts that are spaced apart from one another and form pocket-like receptacles facing one another for receiving opposite ends of the contact element. In this embodiment, the opposite ends of the contact element are each received in a pocket-like receptacle, such that the contact element is held particularly securely on the main body.

Another advantageous further development of the embodiment with the pocket-like receptacle or receptacles provides that these receptacles are shaped substantially complementary to the corresponding end of the contact element. Thus, the end or ends of the contact element are held tightly within the receptacle.

Another embodiment provides, that the retention part be configured as a flat strip, which overlaps the contact element at a point remote from its ends.

Another advantageous further embodiment of the teaching according to the invention provides that the retention means comprise at least one web that is formed onto the elastic material of the main body and rests against the contact element at a point remote from the pocket-like receptacle or receptacles. The web or webs make it possible to adjust the contact element relative to the main body or to achieve an additional fixation of the contact element on the main body.

It is particularly advantageous if at least two webs are provided against which the contact element rests with opposite areas of its edge. In this embodiment, the contact element is held between the webs and is thus secured against any movement in the direction of the webs.

The shape, size and material of the contact element can be selected within wide limits. If the inventive device is used to contact an elongated, e.g. a substantially cylindrical body, for instance a metal pipe or a stripped outer conductor of a coaxial cable, it is useful if the contact element has an elongated shape. When mounted, the contact element then extends in circumferential direction of the body to be contacted and can, for instance, establish electrically conductive contact with the body to be contacted over a substantial part of the circumference thereof In the embodiment with the elongated contact element and the pocket-like receptacles, the ends of the contact element are advantageously inserted into the pocket-like receptacles, as provided for in a further development. When a cylindrical object is contacted, e.g. a stripped outer conductor of a coaxial cable, the contact element is thus held in the pocket-like receptacles by its ends in circumferential direction.

If, for instance, a cable is to be contacted, and the contact element has to be fixed not only in circumferential direction but also in axial direction, it is advantageous in the embodiment with the web or webs if the contact element rests against the web along one of its longitudinal edges or along both of its longitudinal edges.

The material of the main body can be selected within wide limits. The main body can also be made of a plurality of materials. One embodiment provides that the main body comprises a carrier element that is made of metal to increase the stability of the main body.

In the aforementioned embodiment, the carrier element is advantageously strip-shaped. Thus, the main body of the device according to the invention can, for example, be made flexible.

Another further development of the teaching according to the invention provides that the carrier element is permanently connected with the part made of the elastic material, or that the carrier element is coated with the elastic material of the main body, particularly on its side that faces away from the body to be contacted when mounted, or that it is embedded in the elastic material of the main body. On the side of the carrier element that faces toward the body to be contacted when mounted, a contact surface for the contact element is left free. This embodiment can be produced easily and cost-effectively.

The shape and size of the main body can be selected within wide limits. To contact a plate-like body, the main body can, for instance, be plate-shaped, and to contact a bent or curved body, it can have a bent or curved shape.

A further development that is particularly advantageous for contacting pipes or cables of any cross section provides that the main body be configured in such a way that it encircles the body to be contacted in the form of a ring or a sleeve when mounted. In this embodiment, the main body is held securely on the body to be contacted.

In principle, the main body can be rigid, but it is advantageous, if it is flexible. This makes it easier to mount the device on the body to be contacted.

The main body can have a multi-part configuration. In an inventive device that is provided for contacting a pipe, the main body can be made, for instance, of a plurality of consecutive parts in circumferential direction of the pipe to be contacted, e.g. two half ring-shaped parts. However, the main body is advantageously configured as a single part, which is open in circumferential direction and at its free ends is provided with angled or bent straps, which when mounted can be connected with one another, preferably by means of a screwing or clamping device. In this embodiment, due to the one-piece configuration of the main body, the inventive device can be particularly easily mounted.

Another further development provides that the main body be configured as a clamp, which can be tightened around the body to be contacted. This further facilitates mounting.

Another further development of the embodiment with the carrier element provides that the carrier element has at least one opening, preferably at least one opening on either side of the contact element, through which the elastic material extends, such that the elastic material on the side of the carrier element that faces toward the contact element is connected with the elastic material on the side of the carrier element that faces away from the contact element. This is to prevent the elastic material from becoming detached from the carrier element on the side of the carrier element that faces toward the contact element. This kind of detachment could impair the electrical contact between the contact element and the carrier element.

To prevent air and/or moisture from penetrating into the contact area, a further development provides that the device be equipped with sealing means to seal a space that forms between the body to be contacted and the main body when mounted against air and/or moisture penetration.

An advantageous further development of the invention with the sealing means provides that the sealing means have sealing lips made of an elastic material which are arranged on a side of the main body that faces toward the body to be contacted when mounted and are spaced apart from one another perpendicularly to the longitudinal direction of the main body or the axial direction thereof. These sealing lips extend in longitudinal direction of the main body or in its circumferential direction, preferably substantially over the entire length of the main body in this direction, and form a seal relative to the body to be contacted when the device is mounted. This embodiment is simple in its design and provides a reliable seal of the contact.

In the aforementioned embodiment, the retention means are advantageously formed onto the sealing lips, which further simplifies the construction.

The contact element can be configured in any suitable manner, e.g. as a flexible wire or a braided metal strip. A particularly advantageous further development of the teaching according to the invention provides that the contact element be made of a profiled piece of sheet metal. In this embodiment, the production of the inventive device is made surprisingly simpler and thus more cost effective. The contact element can be made, for instance, of profiled sheet metal which is produced by the yard and which can be simply cut to the required length of the contact element as a function of the size of the inventive device. In addition, the inventive contact element made of profiled sheet metal is particularly inexpensive. This reduces the production costs of the inventive device. The contact element can be made of any suitable type of sheet metal that has sufficient electric conductivity, e.g. brass, steel or copper sheet.

The profile of the contact element can be selected within wide limits to meet the corresponding requirements. The contact element is advantageously provided with a substantially wavy or meander-like or zigzag-shaped profile, as provided for by one embodiment. This embodiment is simple and cost effective to produce. Due to the substantially wavy, meander-like or zigzag-shaped profile, the contact element fits securely on the body to be contacted even if component tolerances of the mounted device are relatively large.

A further development of the aforementioned embodiment provides that the profile of the contact element consists of successive peaks and valleys that are round, arched, triangular, or trapezoidal in cross section. The shape of the peaks and valleys can be selected within wide limits as a function of the respective requirements.

The profile of the contact element can be irregular along its extent or uniform only in sections. Advantageously, however, the profile is substantially uniform over the entire length of the contact element. This facilitates production of the contact element and ensures uniform contact between the contact element and the body to be contacted when the device is mounted. For instance, when a stripped outer conductor of a HF cable is contacted in the mounted position of the device, irregular loading of the outer conductor in circumferential direction, which could lead to undesirable reflections of a signal transmitted via the cable, is prevented due to the uniform profile of the contact element in circumferential direction.

Another particularly advantageous further development of the embodiment with the contact element made of profiled sheet metal provides that the contact element be unprofiled or flattened along its ends in longitudinal direction. This makes it easier to mount the contact element on the main body. If the ends of the contact element are held, for instance, in pocket-like receptacles, it is easier to insert the flattened ends into the receptacles and thus easier to mount the contact element on the main body. In this embodiment, mounting can be done not only by hand as in the prior-art devices but in principle also by machine.

In principle, the contact element can be substantially rigid. A further development provides, however, that the contact element be elastically deformable such that it fits elastically resiliently against the electrically conductive part of the body to be contacted. In this embodiment, due to the elastic resilient fit of the contact element on the electrically conductive part, a particularly secure electrically conductive connection is achieved. Furthermore, the resilient fit readily compensates component tolerances of the inventive device and/or the body to be contacted.

Another further development of the embodiment with the carrier element provides that the profile of the contact element forms consecutive projections with which the contact element preferably alternately fits against the body to be contacted and the carrier element when the device is mounted, such that an electrically conductive connection is established between the body to be contacted and the carrier element. In this embodiment, the projections produce a particularly reliable electrically conductive connection between the body to be contacted and the carrier element, which in turn can, for instance, be connected with a ground cable.

Depending on the corresponding requirements, the contact element can be permanently connected with the main body.

The contact element can also be detachably connected with the main body, as provided for by a further embodiment. This makes it easier to install the contact element on the main body and, if necessary, to deinstall it again.

According to another embodiment, the contact element can be permanently connected with the elastic material of the main body.

Another especially advantageous further development of the teaching according to the invention provides that the elastic material of the main body, on its side facing toward the contact element, has a contact surface for the contact element, which is substantially complementary to the contact element such that the contact element rests over substantially its entire length against the elastic material of the main body. In this manner, a particularly reliable fit of the contact element on the electrically conductive part of the body to be contacted is achieved when the device is mounted. The elastic material of the main body furthermore creates an elastic resilient fit of the contact element against the electrically conductive part of the body to be contacted.

In the aforementioned embodiment, the contact element can be connected with the elastic material of the main body in any suitable manner. For example, the part that is made of the elastic material can be an extruded strip material with which the contact element is connected. However, an advantageous further development provides that the contact element be coated by the elastic material of the main body. This embodiment is simple and cost effective to produce. It also ensures that the contact surface of the main body is shaped complementary to the profile of the contact element.

A further development of the embodiment with the one-piece main body and the straps provides that the contact element extends up to the straps. In this embodiment, e.g. a ground cable can be connected with the straps such that an electrically conductive connection is established via the contact element between the ground cable and the electrically conductive part of the body to be contacted, e.g. a stripped outer conductor of a coaxial cable.

Finally, a further development of the teaching according to the invention provides that the elastic material of the main body and/or the sealing lips be made of an elastomer, particularly vulcanized rubber, and/or a thermoplastic elastomer. These materials can be processed easily and cost effectively and are highly resistant against chemical and mechanical influences.

The invention will now be described in greater detail with reference to the embodiments depicted in the attached drawing.

BRIEF DESCRIPTION OF THE DRAWINGS

FIG. 3 is a section taken along line III—III in FIG. 2, FIG. 4 is a section taken along line IV—IV in FIG. 2, FIG. 5 is a schematic perspective view of the device according to FIG. 1 in its mounted position, FIG. 6 shows a second embodiment of a device according to the invention in the same view as that depicted in FIG. 2, FIG. 7 is a section taken along line VII—VII in FIG. 6, FIG. 12 shows a third exemplary embodiment of a device according to the invention in the same view as that depicted in FIG. 2.

In the drawing figures, identical or corresponding components are provided with identical reference numerals.

DETAILED DESCRIPTION OF THE PREFERRED EMBODIMENTS

Figure 1:
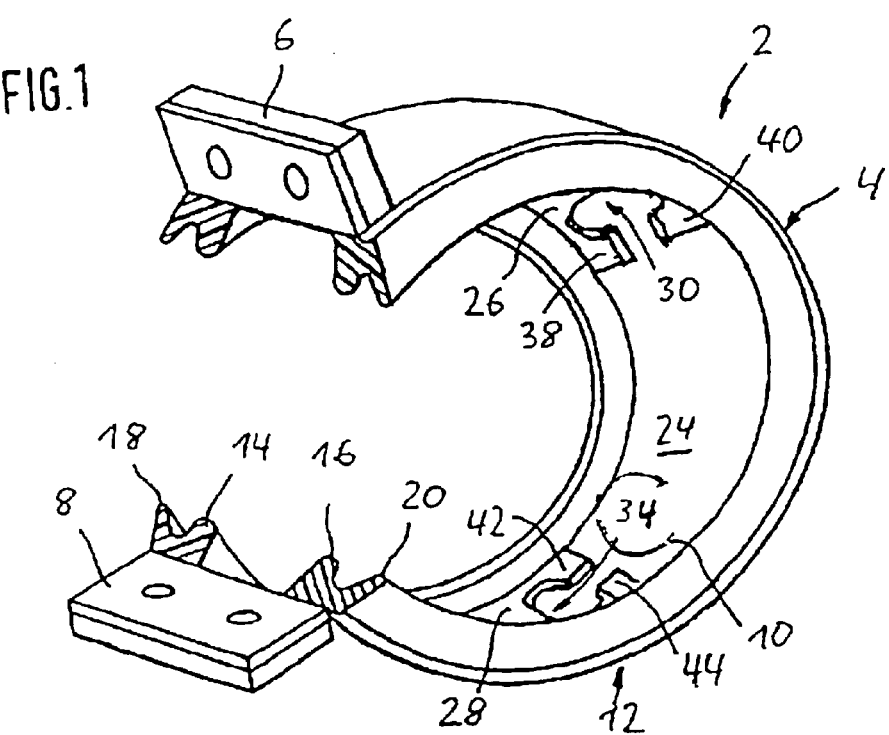
FIG. 1 is a schematic perspective view of an exemplary embodiment of the inventive device in the form of a clamp.

FIG. 1 shows a first embodiment of an inventive device 2 with a flexible main body 4 configured as a clamp, which in this embodiment is a single piece and is open in circumferential direction and provided with angled straps 6, 8 at its free ends. When the device is mounted, these straps can be connected with one another, as will be explained in greater detail below. Device 2 serves to connect a stripped outer conductor of a coaxial cable with a ground cable and thereby to ground it, as will be explained in greater detail with reference to FIG. 5.

Main body 4 comprises a substantially strip-shaped carrier element 10 that is made of metal and a part 12 that is made of an elastic material, which in this embodiment is an elastomer, in which the carrier element 10 is embedded with its axial edges and is thereby connected with part 12 made of the elastic material (cf. FIG. 3).

Part 12 made of the elastic material forms sealing lips 14, 16 on the side facing the body to be contacted when mounted and additional sealing lips 18, 20 formed respectively on the axially outer side of sealing lips 14, 16. When mounted, the main body 4 with its sealing lips 14, 16 and its additional sealing lips 18, 20 fits against an outer surface of the body to be contacted so as to form a seal, such that a space, which forms between the body to be contacted and the main body 4 when mounted, is sealed against air and/or moisture penetration.

To retain a contact element (not depicted in FIG. 1) the inventive device 2 is further provided with retention means, which will be explained in greater detail with reference to FIG. 2.

Figure 2:
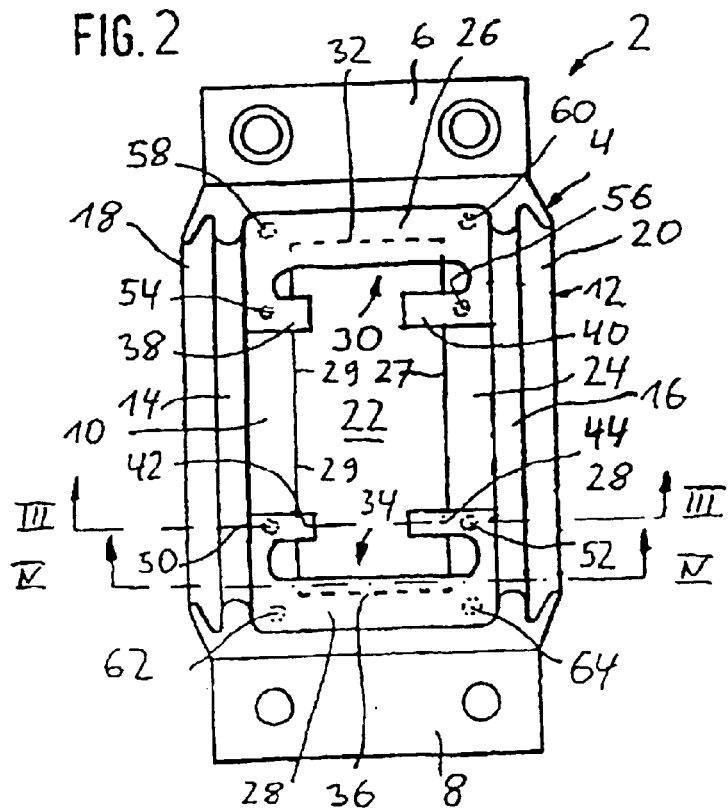
FIG. 2 is a schematic view of the radial inner surface of the device in accordance with FIG. 1.

FIG. 2 shows device 2 with a contact element 22, which in this embodiment is formed by a braided metal strip and is held against the radially inner surface 24 of metal part 10 of main body 4.

In this embodiment the retention means for holding the contact element 22 against main body 4 comprise parts 26, 28, which are made of the same elastic material as the sealing lips 14 to 20 and part 12 and which are formed onto the inner side of sealing lips 14, 16 in axial direction of the main body 4.

As may be seen from FIG. 2, part 26 extends from a longitudinal edge 27 of contact element 22 to the opposite longitudinal edge 29 thereof perpendicularly across contact element 22. It tightly overlaps contact element 22 on its side facing away from main body 4 and thereby holds it against main body 4.

Between the surfaces of part 26 and carrier element 10 facing one another, a pocket-like receptacle 30 for a free end 22 of contact element 22 is formed. This pocket-like receptacle 30 is shaped to be substantially complementary to the free end 32 of the contact element such that the latter is received snugly in receptacle 30. Correspondingly, the surfaces of part 28 and carrier element 10 facing one another form a pocket-like receptacle 34 for receiving a free end 36 of contact element 22 opposite of free end 32. Since the ends 32, 36 of contact element 22 are received in the pocket-like receptacles 30, 34 in circumferential direction, the contact element is substantially fixed in circumferential direction of device 2.

Due to this complementary shaping of pocket-like receptacles 30, 34 relative to the associated ends 32, 36 of contact element 22, contact element 22 in this embodiment is fixed in both circumferential and axial direction of device 2. However, the pocket-like receptacles 30, 34 can also be configured in such a way that contact element 22 is received in pocket-like receptacles 30, 34 so that it can be shifted in both circumferential and axial direction of device 2. In this type of an embodiment, parts 26, 28 can be formed by flat strips of an elastic material.

To fix contact element 22 in addition at a point remote from receptacles 30, 34, part 26 is provided with two webs 38, 40, which extend inwardly in axial direction from sealing lips 14 or 16 of main body 4 and overlap the contact element 22 on its side facing away from main body 4.

Similarly, part 28 is provided with webs 42, 44.

To fix contact element 22 to main body 4, its one end 32 is first pushed in upward direction in FIG. 2 under web 38, 40 and into the pocket-like receptacle 32. Subsequently, the opposite end 36 of contact element 22 is pushed in downward direction in FIG. 2 under webs 42, 44 and into the pocket-like receptacle 34. In this process, contact element 22 and webs 38 to 44 are elastically deformed to the required extent. In its mounted position depicted in FIG. 2, contact element 22 with its side facing toward main body 4 rests against carrier element 10 thereof and is held on main body 4 in a substantially form-fitting manner in both circumferential and axial direction of main body 4 by the retention means, which are formed by the pocket-like receptacles 30, 34 and webs 38 to 44. The teaching according to the invention thus enables the contact element 22 to be fixed on main body 4 in a particularly simple manner, without any adhesive, a welded joint, or the like being required for this purpose.

To make it easier to insert the ends 32, 36 of contact element 22 into the pocket-like receptacles 30, 34, parts 26, 28 can be provided with continuous slits extending in circumferential direction of main body 4.

FIG. 3 shows a section taken along a line III—III in FIG. 2. Here it may be seen that webs 42, 44 are provided with undercuts 46, 48 and overlap contact element 22 along its opposite edges 27, 29. To prevent webs 42, 44 from getting detached from carrier element 10 of main body 4 which would cause contact element 22 to lose contact to carrier element 10, carrier element 10 is provided with openings 50, 52 in the areas of webs 42, 44 through which the elastic material of main body 4 extends, such that webs 42, 44 are connected with the elastic material on the radially outer surface of carrier element 10. This reliably prevents webs 42, 44 from becoming detached from carrier element 10. Correspondingly, openings 54, 56 are formed in the area of webs 38, 40, and openings 58, 60 in the area of the pocket-like receptacle 30, and openings 62, 64 in the area of pocket-like receptacle 34.

From FIG. 4, which is a section taken along a line IV—IV in FIG. 2, it is apparent that pocket-like receptacle 34 is shaped substantially complementary in cross section to the free end 36 of contact element 22.

FIG. 5 shows the device according to FIG. 1 in its mounted position in which the main body 4 encircles the body to be contacted, which in this embodiment is a coaxial cable 66, like a sleeve. To fasten the device 2 to the coaxial cable 66, the main body 4, which is configured as a clamp, is tightened around the coaxial cable 66 to be contacted by means of metal screws 68, 70, which extend through the through-holes made in strap 6 and engage with the threaded holes made in strap 8.

When main body 4 is tightened, sealing lips 14, 16 and the additional sealing lips 18, 20, sealingly fit against jacket 72 of coaxial cable 66 in such a way that they seal the space that forms between the coaxial cable 66 and main body 4 when mounted against air and/or moisture penetration.

When main body 4 is tightened, contact element 22 furthermore rests against the previously stripped outer conductor 74 of coaxial cable 66 at a point remote from sealing lips 14–20 so that an electrically conductive connection is established between the outer conductor 74 and the carrier element 10 of main body 4 via contact element 22. Since the carrier element 10 extends up to straps 6, 8, an electrically conductive connection to a conductor, e.g. a ground cable 76, as indicated schematically in FIG. 5, is established by means of screws 70. To this end, ground cable 76 can be connected with one of screws 70 by means of a connecting eyelet 78.

Thus, the desired electrically conductive connection is established between ground cable 76 and outer conductor 74 of the coaxial cable 66, such that this outer conductor 74 is grounded.

FIG. 6 depicts a second embodiment of an inventive device 2. This embodiment is distinguished from that shown in FIG. 1 in that contact element 22, which is held on main body 4 in pocket-like receptacles 30, 34 on the radially inner surface 24 of carrier element 10 is made of profiled sheet metal. In this embodiment, contact element 22 has a substantially wavy or meander-like profile, as will be explained in greater detail with reference to FIG. 8.

FIG. 7, which depicts a section taken along line VII—VII in FIG. 2 shows that the shape of pocket-like receptacle 34 is substantially complementary to that of free end 36 of contact element 22.

Figure 8:
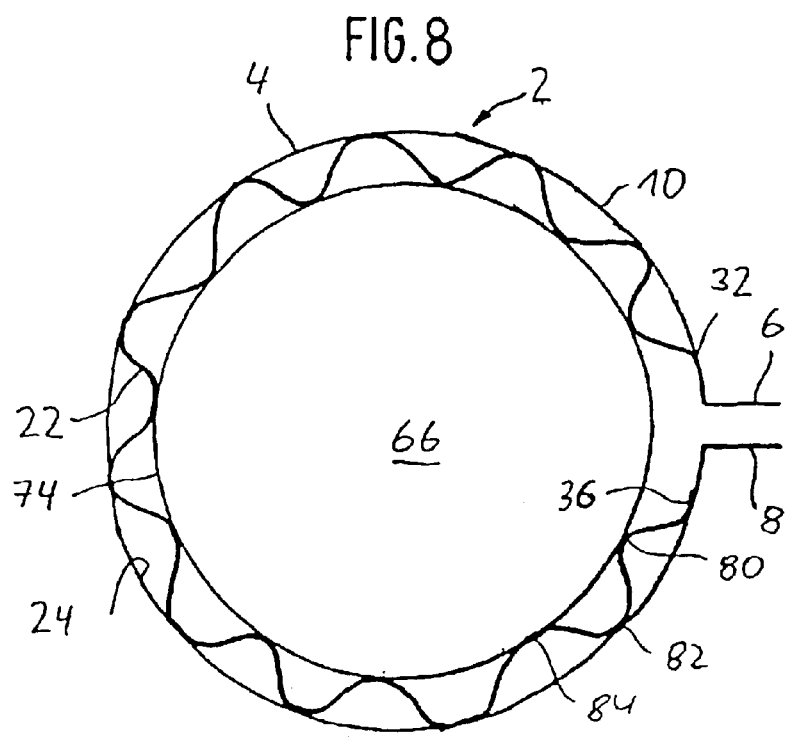
FIG. 8 is a highly schematic view of a radial section through the device according to FIG. 6 in its mounted position.

FIG. 8 highly schematically depicts a radial section through device 2 when mounted according to FIG. 6, which is taken in axial direction in an area in which contact element 22 rests against the stripped outer conductor 74 of coaxial cable 66. From this Figure it may be seen that contact element 22 has a substantially meander-like or wavy profile. This profile of the sheet metal of which contact element 22 is made forms successive projections in the form of arched peaks and valleys of which only three are identified by reference numerals 80, 82, 84 in FIG. 5. With these successive projections 80, 82, 84, contact element 22 alternately rests against the stripped outer conductor 74 of coaxial cable 66 and the radial inner surface 24 of carrier element 10 of the main body. This establishes a secure electrically conductive connection between outer conductor 74 and carrier element 10 and thus also with ground cable 76 via straps 6, 8.

Contact element 22 in this embodiment is made of a thin piece of sheet metal and is thus elastically deformable such that when device 2 is mounted it rests elastically resiliently against the outer conductor 74 and the radial inner surface 24 of carrier element 10.

As may be seen in FIG. 8, contact element 22 in this embodiment is substantially uniformly profiled in its longitudinal direction, i.e. in circumferential direction of main body 4. In the mounted position of device 2, very irregular loading in circumferential direction of the outer conductor 74 of coaxial cable 66, which in a HF cable might result in undesirable reflections of an electrical signal that is transmitted via the cable, is thereby avoided. Loading of the outer conductor 74 in circumferential direction is all the more uniform the smaller the distance in circumferential direction between the peaks of the profile of contact element 22.

The contact element 22 made of profiled sheet metal can be easily and cost-effectively produced and simply cut to size. This ensures simple and therefore cost-effective production of inventive device 2.

Figure 9:
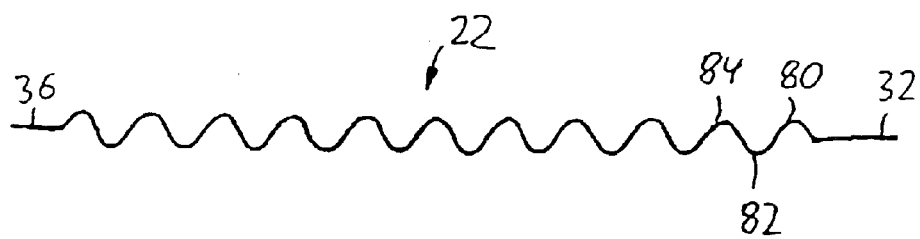
FIG. 9–11 show a highly schematic view of different embodiments of the cross sections of contact elements made of profiled sheet metal.
Figure 10:
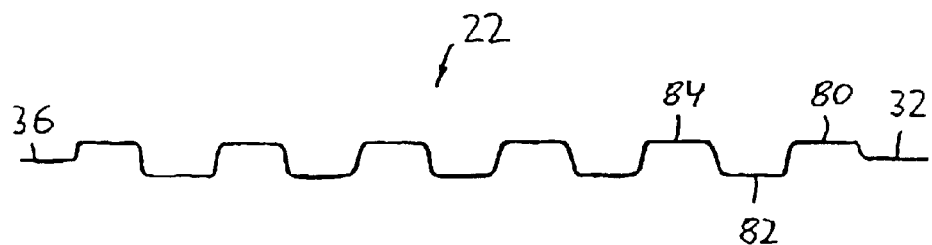
Figure 11:
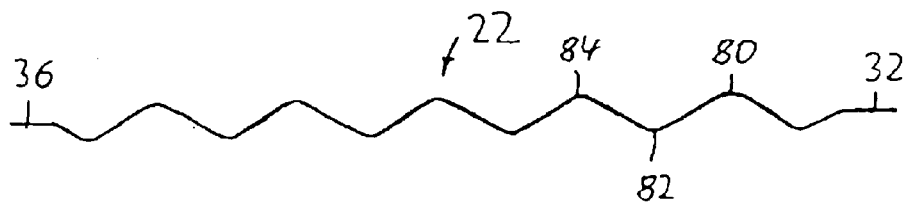

The profile of contact element 22 can be selected within wide limits. FIGS. 9 to 11 show examples of different profiles. The profile of contact element 22 shown in FIGS. 9 and 10 is substantially meander-like or wavy in cross section, while that depicted in FIG. 11 is substantially zigzag-shaped.

FIGS. 9 to 11 indicate that the ends 32, 36 of contact element 22 are not provided with a profile to make it easier to insert ends 32, 36 into the pocket-like receptacles 30, 34. If contact element 22 is made, for instance, from continuously profiled yard ware, the ends 32, 36 of contact element 22 can be flattened after it has been cut to size.

FIG. 12 shows a third exemplary embodiment of a device 2 according to the invention, which is distinguished from the embodiment shown in FIG. 1 in that the retention means formed onto the elastic material 12 of main body 4 comprise a single part 86. Part 86 is formed onto the inside of sealing lips 14, 16 in axial direction and is configured as a flat elastomer strip that extends from the longitudinal edge 27 of contact element 22 up to the opposite longitudinal edge 29 perpendicularly across contact element 22 and overlaps and thereby retains contact element 22 on its side facing away from main body 4. As may be seen in FIG. 12, part 86 is arranged at a point remote from ends 32, 36 of contact element 22.

What is claimed is:

1. Device for establishing electrically conductive contact with an electrically conductive part of a pipe or a cable, comprising a main body made at least partially of an elastic material, which fits against the body to be contacted and comprising a contact element which is held by retention means on the side of the main body that faces toward the body to be contacted when mounted in order to establish an electrically conductive connection with the body to be contacted, whereby the retention means comprises at least one retention part which is made of an elastic material and is formed onto the elastic material of the main body and which extends from one edge of the contact element to the opposite edge of the contact element, such that the retention part overlaps the contact element on its side facing away from the main body and thus holds it to the main body so that said contact element is detachably connected with said main body, the retention part forms a substantially pocket-like receptacle for the contact element and the retention means at a point remote from said pocket-like receptacle has at least one web that is formed onto the elastic material of the main body against which the contact element rests when mounted.

2. Device as claimed in claim 1, characterized in that the retention part is provided with an opening that forms a pocket-like receptacle.

3. Device as claimed in claim 1, characterized in that the pocket-like receptacle is formed between surfaces of the retention part facing one another and the main body.

4. Device as claimed in claim 1 characterized in that the retention means includes a second retention part, said at least one retention part and said second retention part are spaced apart from one another and have pocket-like receptacles facing one another to receive opposite ends of the contact element.

5. Device as claimed in claim 1, characterized in that the pocket-like receptacle is shaped to be complementary to the associated end of contact element.

6. Device as claimed in claim 1, characterized in that said at least one retention part is shaped as a flat strip that overlaps the contact element at a point remote from the ends thereof.

7. Device as claimed in claim 1, and further comprising a second web formed onto the elastic material of the main body against which the contact element will also rest when mounted.

8. Device as claimed in claim 1, characterized in that the contact element has an elongated shape.

9. Device as claimed in claim 1, characterized in that the contact element with its ends is received in said pocket-like receptacle in a longitudinal direction.

10. Device as claimed in claim 1, characterized in that the contact element when mounted rests against said at least one web and said second web along one of its longitudinal edges or along both its longitudinal edges.

11. Device as claimed in claim 1, characterized in that the main body has a carrier element made of metal.

12. Device as claimed in claim 11, characterized in that the carrier element is substantially strip-shaped.

13. Device as claimed in claim 11, characterized in that the carrier element is permanently connected with the part that is made of said elastic material, or that the carrier element is at least partially coated with the elastic material of the main body on its side facing away from the body to be contacted when mounted, or is embedded in the elastic material of the main body, wherein a contact surface for the contact element is left free on the side of the carrier element that faces toward the body to be contacted when mounted.

14. Device as claimed in claim 11, characterized in that the carrier element has at least one opening on either side of the contact element through which the elastic material extends, such that the elastic material on the side of the carrier element that faces toward the contact element is connected with the elastic material on the side of the carrier element that faces away from the contact element.

15. Device as claimed in claims 11, characterized in that the profile of the contact element forms successive projections with which the contact element rests, preferably alternately, against the electrically conductive part of the body to be contacted and the carrier element when the device is mounted, such that an electrically conductive connection is established between the electrically conductive part of the body to be contacted and the carrier element of the main body.

16. Device as claimed in claim 1, characterized in that the main body is configured in such a way that it encircles the body to be contacted like a ring or a sleeve when mounted.

17. Device as claimed in claim 1, characterized in that the main body is made flexible.

18. Device as claimed in claim 1, characterized in that the main body forms a single piece and is open in circumferential direction and at its free ends is provided with angled or bent straps, which can be connected with one another when mounted, preferably by means of a screwing or clamping device.

19. Device as claimed in claim 18, characterized in that the contact element extends up to the straps.

20. Device as claimed in claim 1, characterized in that the main body is configured as a clamp that can be tightened around the body to be contacted.

21. Device as claimed in claim 1, characterized in that the device is provided with sealing means for sealing a space that forms between the body to be contacted and the main body when mounted against at least one of air and moisture penetration.

22. Device as claimed in claim 21, characterized in that the sealing means are sealing lips that are made of an elastic material and are spaced apart from one another perpendicularly to the longitudinal direction of the main body or in its axial direction and are arranged on a side of the main body that faces toward the body to be contacted when mounted, which sealing lips extend in longitudinal direction of the main body or in its circumferential direction and substantially over the entire length of the main body in this direction, and which fit against the body to be contacted so as to form a seal when the device is mounted.

23. Device as claimed in claim 22, characterized in that the retention means are formed onto the sealing lips.

24. Device as claimed in claim 21 characterized in that the elastic material of at least one of the main body and the sealing lips are formed of an elastomer selected from the group consisting of vulcanized rubber and a thermoplastic elastomer.

25. Device as claimed in claim 1, characterized in that the contact element is made of profiled sheet metal.

26. Device as claimed in claim 25, characterized in that the profile of the contact element is substantially wavy or meander-like or zigzag-shaped.

27. Device as claimed in claim 25, characterized in that the profile of the contact element consists of consecutive peaks and valleys that are round, arched, triangular, or trapezoidal in cross section.

28. Device as claimed in claim 25, characterized in that the profile is uniform over substantially the entire length of the contact element.

29. Device as claimed in claim 25, characterized in that the contact element has no profile at its ends in longitudinal direction or is flattened at these ends.

30. Device as claimed in claim 25, characterized in that the contact element is elastically deformable such that it fits elastically resiliently against the body to be contacted when mounted.

31. Device as claimed in claim 1, characterized in that the contact element is permanently connected with the main body.

32. Device as claimed in claim 1, characterized in that the main body is made substantially of the elastic material.

33. Device as claimed in claim 1, characterized in that the contact element is permanently connected with the elastic material of the main body.

34. Device as claimed in claim 1, characterized in that the elastic material of the main body, on its side facing toward the contact element, is provided with a support surface for the contact element which is shaped substantially complementary to the cross section of the contact element such that the contact element fits against the elastic material of the main body over substantially its entire length.

35. Device as claimed in claim 1, characterized in that the contact element is coated with the elastic material of the main body.

\* \* \* \* \*